US007503974B2

(12) United States Patent
Mintz et al.

(10) Patent No.: US 7,503,974 B2
(45) Date of Patent: Mar. 17, 2009

(54) CEMENTITOUS MATERIAL

(75) Inventors: David Mintz, Boca Raton, FL (US); Jens Decker, Ann Arbor, MI (US)

(73) Assignee: Stellar Materials, Inc., Boca Raton, FL (US)

( * ) Notice: Subject to any disclaimer, the term of this patent is extended or adjusted under 35 U.S.C. 154(b) by 0 days.

(21) Appl. No.: 11/688,410

(22) Filed: Mar. 20, 2007

(65) Prior Publication Data
US 2007/0221099 A1 Sep. 27, 2007

Related U.S. Application Data

(60) Provisional application No. 60/784,672, filed on Mar. 22, 2006.

(51) Int. Cl.
*C04B 28/34* (2006.01)
*C04B 28/06* (2006.01)

(52) U.S. Cl. .................. 106/690; 106/691; 106/692
(58) Field of Classification Search ............... 106/690, 106/691, 692
See application file for complete search history.

(56) References Cited

U.S. PATENT DOCUMENTS

| 3,522,063 | A | * | 7/1970 | Treffner et al. |
| 3,966,482 | A | * | 6/1976 | Cassidy et al. |
| 4,174,227 | A | * | 11/1979 | Tomic |
| 5,246,496 | A | * | 9/1993 | Sugama |
| 5,387,566 | A | * | 2/1995 | Porter et al. |
| 2003/0041785 | A1 | * | 3/2003 | Harrison |
| 2004/0025752 | A1 | * | 2/2004 | Sugama |
| 2006/0213395 | A1 | * | 9/2006 | Lu et al. ................. 106/35 |

FOREIGN PATENT DOCUMENTS

WO    WO 9204293    *    3/1992

* cited by examiner

*Primary Examiner*—Paul Marcantoni
(74) *Attorney, Agent, or Firm*—Gifford, Krass, Sprinkle, Anderson & Citkowski, P.C.

(57) ABSTRACT

A cementitious material is provided that includes a phosphate based component and an alkali earth component. The alkali earth ion component has as a majority source a calcium aluminate calcium ion source of dodeca-calcium hepta-aluminate, or tricalcium aluminate. Magnesium oxide that has been fused and crushed to a size of less than 200 microns, alone or in combination with the calcium aluminate calcium ion source is also provided as the alkali earth ion component. When the phosphate based component and alkali earth ion components are combined in appropriate proportions, a rigid structure is obtained. A cementitious material formulation is also provided having an aqueous acidic phosphate solution as a part B and an alkali earth ion source as a part A that includes calcium aluminate, magnesium oxide or a combination thereof. Other additives include strength enhancing insoluble phosphate additive, an impurity metal reaction suppressant, tackifiers, anti-foaming agents, and the like.

25 Claims, No Drawings

US 7,503,974 B2

CEMENTITIOUS MATERIAL

CROSS-REFERENCE TO RELATED APPLICATIONS

This application claims priority of U.S. Provisional Patent Application Ser. No. 60/784,672 filed Mar. 22, 2006, which is incorporated herein by reference.

FIELD OF THE INVENTION

The present invention in general relates to cementitious materials and in particular to phosphate reactants operative to form a cementitious aggregate having superior processing and/or properties in performance as a refractory aggregate.

BACKGROUND OF THE INVENTION

Ceramic cements are mixtures of water and reactive metal oxides that react to form a hardened mass. Cements are often used as adhesives to concrete. Portland cement, for example, is a mixture of water and calcined lime and silica that cures to form principal phases of di-calcium silicate and tri-calcium silicate. Portland cement has attractive handling and cost attributes, yet suffers from inconsistency of physical properties, relatively high viscosity, and slow curing rates. As a result, Portland cement is not well suited for pumping or spraying. In addition, Portland cement has poor adhesion to a Portland cement substrate. As a result when there is an interruption in forming a Portland cement body, a structural discontinuity results thereby precluding usage as a surface coating or patching.

Phosphate based cementitious materials address a number of limitations associated with Portland cement and are characterized by excellent strength and hardness properties and adhesion to most materials, including set cements, brick, metal, wood, most wood products, and asphalt. Phosphate based cementitious materials also have good chemical stability and compressive strength, and toughness superior to that of Portland cement. Moreover, phosphate based cementitious materials tend to set up with little or no open porosity and therefore can be used to form waterproof forms and seals.

A desirable phosphate based cementitious material has the characteristics of an adjustable set time, strength maintenance over time at operating temperature, and limited dimensional changes as a function of temperature. The production of an advantageous cementitious material is particularly problematic when the cementitious material is used as a refractory. In refractory cementitious material, the high temperatures experienced serve to enhance dimensional changes while facilitating undesired chemical reactions that are of little consequence at lower operating temperature.

Cementitious materials using a phosphate based binder to set the relative position of aggregate particulate, while effective in forming a variety of cementitious materials, have proven difficult in practice to obtain the properties theoretically achievable. In the case of calcium aluminate cements, the reaction of phosphate with a calcium source yields a calcium phosphate based binder. As the phosphate reagent such as phosphoric acid is typically provided in solution form, the kinetics and homogeneity of reactive calcium ions is a factor in determining cementitious material set kinetics and strength.

The prior art teaches the use of calcium monoaluminate (CA) and calcium dialuminate ($CA_2$ or synonymously known as grossite) as dominant sources of calcium ions for the formation of calcium hydrogen phosphate binder, as detailed for example in U.S. Pat. No. 5,888,292. The propensity of calcium monoaluminate to hydrate is a significant contributor to the early set strength of phosphate cements, and reaction from this calcium source tends to be slow. Grossite based on a framework of aluminum tetraoxide tetrahedra imparts the more refractory nature on the resulting cement than CA with the cost of being slower to set and as a result more amenable to unreacted inclusions within the binder. These aluminum rich calcium aluminate bases as a calcium source tend to slow material set and incorporate aluminum rich inclusions that reduce the overall operating temperature of a cementitious material and material strength.

In order to obtain refractory cementitious materials at melting temperatures in excess of 2000° F. (1093° C.), resort is often made to magnesium phosphate binders produced through the reaction of magnesium oxide with a soluble phosphate or phosphoric acid. A problem associated with formation of a magnesium phosphate binder is a highly exothermic reaction associated with neutralization of phosphoric acid by magnesium oxide. Practically, reactions between phosphoric acid and magnesium oxide result in weak articles setting at room temperature and set times which are often too quick for proper handling. As a result, magnesium oxide is combined with an aluminum phosphate solution even though cost and working properties would otherwise favor the reaction of magnesium oxide with phosphoric acid.

Additional problems associated with phosphate cements include phase transformation from polyphosphates, anonymously known as hexaphosphates and/or metaphosphates, to orthophosphates. The phase transformation to orthophosphate results in a reduction in crush strengths in the range of from 1000° F. (538° C.) to 1500° F. (816° C.). As a result, the durability of such cements in furnaces operating in this temperature range is reduced.

Phosphate cements are also particularly susceptible to metal contaminants that readily form metal phosphates. Metal contamination is often associated with degradation of crushing and cutting tools used to process cementitious material precursors and refractory aggregates which are part of the formulation.

The reaction of metal with phosphoric acid inevitably releases gaseous byproducts that are either retained as voids within the cementitious material or percolate therethrough yielding low energy crack propagation pathways through the material.

Thus, there exists a need for phosphate cement additives for addressing the aforementioned limitations of existing phosphate cement binder. The ability to control set properties and strength facilitates the use of cementitious materials particularly as refractories.

SUMMARY OF THE INVENTION

A cementitious binder is provided that includes a phosphate based component and an alkali earth component. The alkali earth ion component has as a majority by alkali earth ion atomic stoichiometry a calcium aluminate calcium ion source of dodeca-calcium hepta-aluminate, tricalcium aluminate or a combination thereof. When the phosphate based component and alkali earth ion components are combined in appropriate proportions, a rigid structure is obtained upon forming a calcium phosphate.

A two part cementitious material formulation is provided that includes magnesium oxide that has been fused and crushed to a size of less than 200 microns as part A and an aqueous solution of phosphoric acid as part B. A cementitious material formulation is also provided having an aqueous acidic phosphate solution as a part B and an alkali earth ion source as a part A that includes calcium aluminate, magnesium oxide or a combination thereof. A strength enhancing insoluble phosphate additive is also provided such as boron phosphate, lithium phosphate, or fluoroapatite. A cementitious material formulation is also provided that includes an aqueous acidic phosphate solution as a part B, an alkali earth ion source of calcium aluminate, magnesium oxide, or a combination thereof and an impurity metal reaction suppressant having the formula:

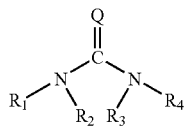

where Q is oxygen or sulfur, and $R_1$-$R_4$ are each independently hydrogen, $C_1$-$C_8$ alkyl and $C_6$-$C_{12}$ aryl; specific $R_1$-$R_4$ groups include ethyl, butyl, phenyl, and tolyl; preferably, Q is sulfur; exemplary specific suppressants include thiourea and N,N'diethyl thiourea.

DETAILED DESCRIPTION OF THE PREFERRED EMBODIMENTS

The present invention has utility as a phosphate cement binder for aggregate and as a resulting refractory cementitious material. Optional control over set properties and strength are obtained through the addition of ions reactive with phosphate to form a binder compound disfavoring transformation relative to an orthophosphate. As a result, inclusion of a secondary phosphate binder relative to calcium hydrogen phosphate or magnesium inclusive phosphate binders is the improvement of strength between 1000° F. (538° C.) and 1800° F. (982° C.). Optionally, a corrosion inhibitor is provided to sequester impurity metals that otherwise result in gas evolution that tends to bloat the cementitious material and induce mechanical weakening.

Phosphate-cement process according to the present invention is based on an acid base reaction between an alkali earth ion component and a phosphate based component. The preferred form of the present invention is a dry mix as part A to which a liquid part B inclusive of the phosphate based component is added to initiate cure. A dry form of part B is also functional to which water is added at mixing with part A.

As used herein "total dry weight percent" is defined as the weight percentage of a fully formulated dry portion exclusive of the liquid portion of a part B, water, or other liquids regardless of weight a component is in part A or in part B.

An exemplary phosphate based component includes phosphoric acid, calcium phosphate, potassium phosphate, magnesium phosphate, sodium phosphate, aluminum phosphate, ammonium phosphate, zinc phosphate, boron phosphate, and combinations thereof. Preferred sources of the phosphate based component include calcium phosphate, phosphoric acid, and magnesium phosphate.

Exemplary ion component includes magnesium oxide, dolomite, zinc oxide, aluminum oxide, calcium oxide, lithium carbonate, barium carbonate, barium sulfate, molybdenum oxide, calcium hydroxide, aluminum hydroxide, tin oxide, nickel oxide, nickel hydroxide, cobalt oxide, cobalt hydroxide, vanadium oxide, magnesium hydroxide, iron oxide, titanium oxide, chromium oxide, chromium hydroxide, dolomite, manganese oxide, zirconium oxide, zirconium hydroxide, NaOH, KOH, sodium carbonate, and potassium carbonate. Preferred sources of alkali earth ions for the phosphate cement reaction process include magnesium oxide and calcium aluminates.

According to the present invention, it has been found that the use of dodeca-calcium hepta-aluminate ($C_{12}A_7$ or mayenite), tricalcium aluminate ($C_3A$), or a combination thereof as the principal sources of calcium ions for the formation of calcium phosphate binder leads to a higher refractory material. It is appreciated that owing to the higher atomic percent of calcium ions in $C_{12}A_7$ and $C_3A$ relative to CA and $CA_2$, that a lesser quantity of dodeca-calcium hepta-aluminate or tricalcium aluminate is needed to form an effective binder. The maintenance of calcium stoichiometry relative to prior art calcium aluminates with the substitution of the inventive calcium sources is easier to maintain during set at a typical loading for such cementitious material components. Owing to rapid hydration of dodeca-calcium hepta-aluminate and tricalcium aluminate relative to CA and $CA_2$, inventive calcium aluminate calcium ion sources are noted to reduce the number density and size of unreactive calcium aluminate inclusions within a cementitious material matrix. Additionally, the inventive calcium aluminates $C_{12}A_7$ and $C_3A$ as the predominant calcium sources for reaction are noted to increase the set rate relative to conventional cementitious materials. Preferably, $C_{12}A_7$, $C_3A$ and combinations reactions thereof are reacted with liquid phosphoric acid to form a phosphate binder for a cementitious material. While particulate of $C_{12}A_7$ or $C_3A$ is used in powdered form in a variety of sizes, preferably the formation of a binder matrix is facilitated when the inventive calcium aluminate material is introduced having a mean particle size of less than 100 microns. More preferably, the inventive calcium aluminate component is sieved to preclude particulate having a size larger than 100 microns. Most preferably, the mean particle size of inventive calcium aluminate source is less than 60 microns as determined with standard US mesh sieves. Typical loadings of $C_{12}A_7$ in a fully formulated cementitious material inclusive of aggregate is from 0.5 to 5 total weight percent with $C_{12}A_7$ typically being present at about one-fourth the weight percent of CA and/or $CA_2$ calcium aluminate used in prior art cementitious materials. $C_3A$ is typically present from 0.3 to 4 total dry weight percent of a cementitious material composition and is typically present at about one-fifth the weight percent loading of CA and/or $CA_2$ calcium aluminate used in prior art cementitious materials. Preferably, an inventive binder $C_{12}A_7$ or $C_3A$ is present from 0.7 to 2.2 total weight percent of the composition.

It is appreciated that the phosphate binder is readily formed by the substitution in part, or completely of a calcium ion source with magnesium. In particular, MgO forms a phosphate refractory binder matrix for aggregate upon reaction with phosphoric acid or a phosphate solution. The resulting cementitious material has superior refractory properties, as compared to pure calcium aluminate cementitious material. A metal oxide having the formula MgO is fused in a furnace above fusion temperature and reduced surface area and pulverized to a mean particle size of between 1 and 200 microns. A fusion temperature for a metal oxide MgO is 4200° F. (2315° C.). Preferably, an electric arc furnace fusion of seawater magnesia clinker is the preferred form of magnesium oxide used herein. MgO is typically present in a cementitious material composition from 1 to 10 total weight percent in order to adjust the set time of the resulting material. Preferably, MgO is present from 3 to 6 total weight percent of the cementitious material composition with the ability to adjust set time upon addition of phosphoric acid to a time between 20 minutes and several hours. Superior strength and reduced shrinkage are also noted for an MgO-phosphate reaction product binder relative to calcium aluminate cementitious materials. Additionally, it is appreciated that heating the resulting cementitious material to a sufficiently high temperature in the presence of alumina, chromium (III) oxide, or iron (III) oxide induces formation of a spinel having the general formula $MgY_2O_4$ where Y is aluminum, chromium, iron, or a combination thereof. Particularly preferred among the spinels as refractory materials are $MgAl_2O_4$ and $MgCr_2O_4$ with melting temperatures of 3875° F. and 4262° F., respectively. It is appreciated that formation of a spinel binder improves the thermal conductivity and reduces the coefficient of thermal expansion relative to M phosphate binders as well as improving resistance to swelling. It is also noted that fused MgO is kinetically slow hydrating to form metal hydroxides relative to conventional sintered MgO.

It is appreciated that polymer monomers or prepolymers are optionally admixed with the cementitious composition along with conventional catalysts to induce polymerization. The polymer inclusion tends to yield a phosphate cement with less porosity and more resistance to water relative to the composition devoid of resin. Polymers operative herein illustratively include polymethyl methacrylate (pMMA), polyethyl methacrylate (pEMA), polybutyl methyl methacrylate (pBMA) and block copolymers thereof; epoxies; urethanes; silicones; and combinations thereof. A moisture curing resin monomer or prepolymer is noted to preclude the need for a polymerization catalyst and instead rely on composition water for cure. Alternatively a water-soluble polymer such as polyacrylic acid or polyvinyl alcohol is dissolved in the inventive cementitious material composition. It is appreciated that polycarboxylates having a water absorbing property provide a dispersant property as subsequently described. Regardless of the polymer identity, polymer or precursors therefor are present in the range of 0.001 to 3 percent total weight of the final inventive cementitious composition.

Optionally, one or more cure accelerants are added to the inventive cementitious composition. Exemplary accelerants include strong mineral acids such as nitric acid; salts such as sodium chloride and calcium chloride; seed crystals such as aluminum, tin, tin oxide; and inorganic carbonates. An optional accelerant is typically present in the range of 0.005 to 2 total dry weight percent of the inventive cementitious composition.

It is appreciated that curing of the cementitious composition is hastened by either warming the target substrate surface, the phosphate based component, the alkali earth ion component, or a combination thereof. When the phosphate based component or the alkali earth ion component is in a liquid form, a variety of drum heaters are used to heat up the liquids. Drum heaters with internal heating units are particularly well suited for this purpose. A heating temperature in the range of 75° F. (23° C.) to 150° F. (66° C.) is commonly used for this purpose. Heating also promotes the flowability of viscous material. Exemplary types of heaters include band heaters, immersion heaters, and heating cabinets. A band heater is equipped with aluminized steel shell which delivers up to 3,000 Watts of heating power with operating heating temperatures in the range of 60° F. (75° C.) to 400° F. (205° C.). Additionally, an area blanket or quilt is used to insulate a drum heater. Preferably, a temperature shutoff device is installed with a heater for the purpose of preventing overheating of phosphate based component.

One or more tackifiers are optionally added to the inventive cementitious composition to increase the level of cured article plasticity especially for uses where the inventive composition is used in a formless application. Tackifiers include carbohydrates such as saccharides and polysaccharides; starch and derivatives such as pregelatinized starch, dextrin, and corn syrup; naphthalene sulfonate formaldehyde condensate polymers; melamine sulfonate formaldehyde condensate polymers; polyhydroxy polycarboxylic compounds such as tartaric acid and mucic acid; lignosulfonic acid; and salts of any of the aforementioned acid moieties of tackifiers. A tackifier is typically present in the inventive cementitious composition in an amount corresponding to the needed characteristics of resulting product, and in the range of 0.01 to 6 total dry weight percent of the final inventive cementitious composition, more preferably in the range of 0.1 to 2 total dry weight percent. These tackifiers tend to increase cured article strength yet may retard the setting time of the cement mixture. In the event a tackifier slows setting, the tackifier is optionally used in conjunction with a set accelerator such as calcium chloride to restore set rate to a level observed absent the plasticizer.

During the reaction of metal with phosphoric acid, gaseous byproducts are inevitably released that are either retained as voids within the cementitious material or percolate through the curing material to form low energy crack propagation pathways in the cured article. Generally, non-air entrained cementitious compositions having a gaseous content of less than 3% are desired, with a gaseous content of less than 2% being preferred. When anti-foaming agents are used with an inventive composition to provide purposeful air contents of 5 to 8 percent so as to improve the freeze thaw durability of the cementitious composition, it is desirable to adjust the amount of anti-foaming agent used relative to a conventional cementitious formulation to compensate for gas evolution associated with the inventive composition. Conventional anti-foaming agents include non-ionic silicone emulsions, alkylene oxides, and acetylenic diols. The anti-foaming agent is typically present in an amount of from 0.01 to 6 total weight percent and more preferably in an amount in the range of 0.5 to 3 total weight percent.

Optionally, a metal impurity reaction suppressant is added to inhibit gas evolution associated with metal impurity reaction with phosphoric acid. Typically, an impurity metal reaction suppressant is added in a quantity from 0.001 to 0.1 total dry weight percent with the amount of suppressant added being related to factors illustratively including reagent purity and molecular weight of the suppressant. Reaction suppressants operative herein have the formula:

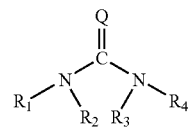

where Q is oxygen or sulfur, and $R_1$-$R_4$ are each independently hydrogen, $C_1$-$C_8$ alkyl and $C_6$-$C_{12}$ aryl. Specific $R_1$-$R_4$ groups include ethyl, butyl, phenyl, and tolyl. Preferably, Q is sulfur. Exemplary specific suppressants include thiourea and N,N'diethyl thiourea.

Optionally, to the inventive cementitious composition are added concurrently a plasticizer such as a lignosulfonate salt, and an anti-foaming agent in amounts that offset to a desired extent of the gaseous entrainment which would otherwise occur. The plasticizer functions to entrain air. In one particular example, an inventive cementitious composition is initially prepared as a dry mix to which water is later added to prepare fluid slurry to which the air entraining plasticizer and anti-foaming are added. In applications where maximum compressive strength is required, the cementitious composition is used with limited or no plasticizer, so that the set article contains minimal entrained air. In applications where lower compressive strength is tolerated and higher levels of freeze/thaw durability are desired, higher loadings of air entraining plasticizer are added.

Optionally, a strength enhancing insoluble phosphate is provided in an inventive composition in order to address strength reduction observed for conventional phosphate cements in a temperature range of 1000° F. (538° C.) to about 1700° F. (927° C.). A strength enhancing additive phosphate is selected to become chemically reactive at a temperature above that at which water chemically coordinated to composition components has been released and as such has a minimal effect on the fast set properties of an inventive composition. The water insoluble strength enhancing phosphate additive typically becomes reactive above 800° F. (427° C.) and preferably above 1000° F. (538° C.). More preferably, the strength enhancing phosphate additive does not form stable hydrates so as to enhance shelf life. Representative strength enhancing additive phosphates include $BPO_4$, $Li_3PO_4$ and fluoroapatite having a formula $Ca_5(PO_4)_3F$. Preferably, the strength enhancing additive phosphate is boron phosphate. A strength enhancing additive phosphate is typically present from 0.5 to 10 total dry weight percent. Preferably, the strength enhancing additive is present from between 1 and 7 total dry weight percent and more preferably between 2 and 5 total dry weight percent. Typical particle sizes for a strength enhancing phosphate additive are comparable in size to binder or aggregate particular sizes and typically between 1 and 200 microns.

Optionally, reinforcing fibers are added to the inventive cementitious composition to improve the tensile strength and toughness (resistance to cracking). Exemplary reinforcing fibers include steel fibers such as nickel and chromium fibers; synthetic fibers such as polypropylene (PP), polyethylene (PE), and polyethylene terephthalate (PET). It is appreciated that friable synthetic fibers decompose in refractory settings. In contrast to prior art steel fiber inclusion such as stainless steel that incorporates nickel and chromium which oxidize at 2200° F. (1204° C.) and are also reactive towards molten metals such as aluminum below this temperature, it has been discovered that the inclusion of steel fibers containing aluminum within the steel alloy are sufficient to form a protective layer of alumina on the steel fiber at elevated temperature. Preferably, the steel fiber has from 0.05 to 8 atomic percent aluminum content. The resulting steel surface alumina layer serves to not only protect the steel fiber against corrosion and molten metal reaction but also affords a surface to which the inventive binder adheres. The steel fiber lengths can vary but are generally between 25 and 30 millimeters with typical steel fiber diameters of between 0.3 and 0.5 millimeters. Steel fiber loadings in an inventive composition typically range from 0.5 to 10 total dry weight percent, the loading depending on factors illustratively including fiber length, fiber diameter, durability requirements, cementitious material thickness, desired refractory aggregate composition, and the desired consistency of the mix. The resulting formulation is pumpable, rammable, castable or gunnable, depending on the desired installation method.

Optionally, the inventive cementitious material has cellulose fiber, polyvinyl alcohol (PVA) fibers, or a combination thereof incorporated therein to provide reinforcement. An advantage of the application of cellulose fibers is that cellulose fibers are hollow and soft, and the resultant articles can be nailed rather than by fixing through pre-drilled holes. The siding and lining products are used on vertical walls, which are a far less demanding environment than roofing. A typical inventive composition contains cellulose fibers in an amount of 0.5 to 6 percent by weight and or PVA fibers in an amount of 0.5 to 5 total weight percent.

A dispersant is optionally added to the inventive cementitious composition. A reduced water content allows the cementitious composition to hydrate and set faster increasing the green strength of an article formed from the cementitious composition resulting in reduced sagging and deformation when an article is removed from a mold or is extruded from a die. Dispersants reduce the effect of the variation in size of the aggregate particles by improving the lubricity of the thin paste layer covering the aggregate allowing improved movement during consolidation to improve the green strength of the curing articles.

A dispersant operative herein illustratively includes polycarboxylates and conventional surfactants conventional to the field. A dispersant is present in the amount of 0.01 to 5 total weight percent to improve the paste phase response to vibration or other energy applied to the cementitious dry cast mixture during consolidation. Dispersants in general are known in the industry to be highly effective and efficient at producing highly flowable concrete with increased compressive strengths, higher density, lower water absorption or permeability, and better surface appearance of the finished unit through reduced imperfections and holes.

A deflocculant is optionally added to the inventive cementitious composition to better improve flowability. Due to the poor performance of conventional deflocculants with liquid phosphate based component of part B, a polyalkylene glycol is used as a deflocculant and is present from 0.05 to 1 total dry weight percent. Polyalkylene glycol is added with water or water based liquid of part B and without intending to be bound by a particular theory is believed to reduce the surface tension of the liquid used within.

The phosphate based component of part B is provided in either solid form such as fine powder or pellets, or in a liquid form. Preferably, the phosphate based component is a liquid solution of agricultural grade phosphoric acid, although commercial, industrial and technical grades are also operative herein. The wet phosphate-providing component is added in an amount adequate to render the admixture workable yet also adequate to provide a sufficient phosphate content to permit a desired rate of setting at ambient environmental temperatures to dry part A. An aggregate is readily formed from 33 kilogram batches of the aggregate and dry component mixture, mixed with an appropriate amount of phosphoric acid solution.

A wet phosphate-providing component especially useful for refractory or high temperature insulation aggregates is prepared as a 1:1 to 4:1 dilution (water:acid) of TG-434, an orthophosphoric acid of $H_3PO_4$ available from Texas Gulf Chemical Co., Raleigh, N.C. A typical composition for TG-434 is:

| | |
|---|---|
| $H_3PO_4$ | 77.73% |
| Solids | 0.1% |
| Iron as $Fe_2O_3$ | 1.3% |
| Aluminum as $Al_2O_3$ | 0.6% |
| Magnesium as MgO | 1.3% |
| Fluoride as F | 0.5% |
| Sulfate as $SO_4$ | 0.8% |
| Calcium as CaO | 0.2% |
| Arsenic as AS | 0.5 ppm |

-continued

| | |
|---|---|
| Organic Carbon as TOC | 55.0 ppm |
| H$_2$O | Balance |

TG-434 is a light green liquid having a specific gravity of 1.71 and an apparent Brookfield viscosity of 150 centipoise at 75° F. (24° C.) and a freezing point at a concentration of 56.3% P$_2$O$_5$ of below −20° F. (−28° C.).

An aggregate component is typically present in an inventive cementitious material from 50 to 95 total dry weight percent. Typical aggregates operative with the present invention illustratively include: flint clay, mulcoa, basalt, olivine, diatomite, vermiculite, perlite, molochite, gibbsite, kyanite, mullite, chromite, tabular alumina, silicon oxide, silica, calcined bauxite, chrome oxide, zirconia, phosphate rock, and mixtures thereof. It is believed that some appreciable amount of aluminum-containing material is necessary for any dense refractory aggregate structure in order to achieve adequate bonding and maintain dimensional and structural stability when exposed to elevated temperatures.

The preferred refractory aggregates include flint clay; Mulcoa 47, 50, 60, 70, and 90; kyanite; mullites; chrome ore; bauxite; tabular alumina; and mixtures thereof. As the intended temperature of use of the refractory increases, the aluminum content of the aggregate generally increases as well.

An aggregate useful in the present invention to be used as an expandable high temperature insulation illustratively includes silica sand #140, mullite #200, kyanite #325, tabular alumina #200, dolomitic lime, and talc. A preferred aggregate for expandable insulation comprises a mixture of silica sand #140, dolomitic lime, and talc. The talc controls the size of the bubbles of carbon dioxide released during expansion and therefore allows the pores in the expanded insulation to be uniform in size. A particularly useful aggregate for an ambient temperature application involving use of this system to contain/solidify/neutralize liquid waste material (i.e., radioactive waste material) is phosphate-containing aggregates, preferably phosphate rock (sold as C-31 Phos-Rock by Texas Gulf Chemical Co.).

An inventive cementitious material, depending on choice of components, is well suited for a variety of uses illustratively including industrial flooring products, such as cast floors, chemically resistant mortars and concretes; sewer applications, expansive grouts, floor screeds, tile adhesives, protective coatings; and refractories such as fireplaces, furnace linings, refractory castables, and patch materials for kilns, furnaces and incinerators.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A cementitious material comprising:
a phosphate based component of calcium phosphate, phosphoric acid, or magnesium phosphate; and
an alkali earth ion component comprising a majority by alkali earth ion atomic stoichiometry a calcium aluminate calcium ion source having a form selected from the group consisting of: dodeca-calcium hepta-aluminate, tricalcium aluminate, and a combination thereof where said phosphate based component and said calcium aluminate are present in proportions to yield a rigid structure upon forming a calcium phosphate.

2. The material of claim 1 wherein said calcium phosphate is calcium hydrogen phosphate.

3. The material of claim 1 wherein said calcium aluminate is dodeca-calcium hepta-aluminate as a majority phase by weight.

4. The material of claim 1 wherein said calcium aluminate has a mean particle size of less than 100 microns.

5. The material of claim 1 further comprising magnesium oxide.

6. The material of claim 5 wherein said magnesium oxide has been fused to a temperature greater than 2315° Celsius.

7. The material of claim 1 further comprising a strength enhancing insoluble phosphate.

8. The material of claim 7 wherein said strength enhancing insoluble phosphate is boron phosphate (BPO$_4$).

9. The material of claim 1 wherein said phosphate based component is preheated to a temperature of from 23° to 66° Celsius.

10. The material of claim 1 further comprising an impurity metal reaction suppressant.

11. The material of claim 10 wherein said impurity metal reaction suppressant has the formula:

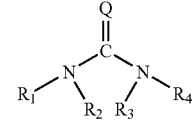

where Q is oxygen or sulfur, and R$_1$-R$_4$ are each independently hydrogen, C$_1$-C$_8$ alkyl and C$_6$-C$_{12}$ aryl; specific R$_1$-R$_4$ groups include ethyl, butyl, phenyl, and tolyl; preferably, Q is sulfur; exemplary specific suppressants include thiourea and N,N'diethyl thiourea.

12. The material of claim 10 further comprising an antifoaming agent selected from the group consisting of nonionic silicone emulsions, alkylene oxides, and acetylenic diols.

13. The material of claim 1 further comprising reinforcing fibers selected from the group consisting of steel fibers having 12 to 14 atomic percent chromium and 2 to 10 atomic percent aluminum, polypropylene, polyethylene, and polyethylene terephthalate.

14. The material of claim 1 fhuther comprising polyalkylene glycol.

15. The material of claim 1 further comprising a polysaccharide tackifier.

16. A two-part cementitious material formulation comprising:
magnesium oxide tat has been fused and crushed to a size of less than 200 microns as part A; and
an aqueous acid phosphate solution as part B.

17. The formulation of claim 16 wherein magnesium oxide is fused in an electric arc furnace above 2315° Celsius.

18. The formulation of claim 16 further comprising alumina reactive with said magnesium oxide to form a spinel.

19. The formulation of claim 16 further comprising boron phosphate.

20. The formulation of claim 16 further comprising an impurity metal reaction suppressant.

21. The formulation of claim 20 wherein said suppressant has the formula:

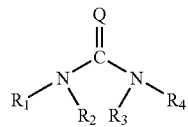

where Q is oxygen or sulfur, and $R_1$-$R_4$ are each independently hydrogen, $C_1$-$C_8$ alkyl and $C_6$-$C_{12}$ aryl; specific $R_1$-$R_4$ groups include ethyl, butyl, phenyl, and tolyl; preferably, Q is sulfur; exemplary specific suppressants include thiourea and N,N'diethyl thiourea.

22. The formulation of claim 16 further comprising steel fibers having 12 to 14 atomic percent chromium and 2 to 10 atomic percent aluminum.

23. A cementitious material formulation comprising:
an aqueous acidic phosphate solution as a part B;
an alkali earth ion source as a part A selected from the group consisting of: a calcium aluminate, magnesium oxide, and a combination thereof; and
a strength enhancing insoluble phosphate additive selected from the group consisting of: boron phosphate, lithium phosphate, and fluoroapatite.

24. A cementitious material formulation comprising:
an aqueous acidic phosphate solution as a part B;
an alkali earth ion source selected from the group consisting of: a calcium aluminate, magnesium oxide, and a combination thereof; and
an impurity metal reaction suppressant having the formula:

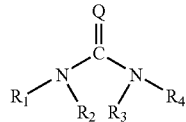

where Q is oxygen or sulfur, and $R_1$-$R_4$ are each independently hydrogen, $C_1$-$C_8$ alkyl and $C_6$-$C_{12}$ aryl; specific $R_1$-$R_4$ groups include ethyl, butyl, phenyl, and tolyl; preferably, Q is sulfur; exemplary specific suppressants include thiourea and N,N'diethyl thiourea.

25. The formulation of claim 24 wherein said impurity metal reaction suppressant is a dialkyl thiourea.

* * * * *